Patented Apr. 13, 1943

2,316,343

UNITED STATES PATENT OFFICE 2,316,343

MANUFACTURE OF CALCIUM SULPHATE

Paul Kubelka, Prague-Orechovka, and Ernst Reiner, Prague-Dejvice, Czechoslovakia; vested in the Alien Property Custodian No Drawing. Application December 19, 1938, Serial No. 246,756. In Czechoslovakia December 29, 1937

6 Claims. (Cl. 23—122)

The present invention has for its object to provide a method permitting to purify natural gypsum or anhydrite or synthetically made calcium sulphate and to remove to a large extent foreign substances and impurities contained therein so as to transform initial materials of minor quality into pure gypsum suitable of the production for high grade products of calcium sulphate such as plaster for stucco, modelling, calcium-sulphate pigments and the like.

According to the principal feature of the method, calcium sulphate, which has been dehydrated completely or at least to the hemi-hydrate, is subjected in contact with diluted aqueous electrolyte solutions to a slow crystallization to dihydrate of calcium sulphate, whereupon the impurities precipitated during this crystallization are mechanically separated from the pure gypsum. It is essential for the success of the purification that the crystallization of the wholly or partly dehydrated initial material should be effected slowly so as to lead to relatively coarse compact crystals of dihydrate of calcium sulphate having a size of e. g. 50–200 microns, since only under this condition the foreign substances comprised in the impure initial material are precipitated to a very far-reaching extent, whereas when the crystallization is effected too rapidly, fine needle-shaped crystals are obtained, which do not admit directly sufficient purification.

As initial material for the crystallization either calcium sulphate free from water in the form of soluble or insoluble anhydrite or hemi-hydrate of calcium sulphate or finally mixtures of these forms are used. The presence of minor quantities of dihydrate of calcium sulphate is not particularly detrimental. When using natural gypsum or precipitated dihydrate of calcium sulphate, it is necessary to carry out a complete dehydration, or at least a dehydration leading up to hemi-hydrate should be carried out before crystallization is effected. For this purpose the gypsum may be dehydrated by dry heating, but it is more advantageous to carry out the dehydration in the same electrolyte solutions in which the subsequent crystallization is effected. For example fine grained crude gypsum may be boiled in the electrolyte solution, if desired under pressure, until nearly complete transformation to hemi-hydrate can be ascertained microscopically. A nearly complete transformation into hemi-hydrate of calcium sulphate is also effected by first dehydrating the crude gypsum to 2–6% $H_2O$ by dry heating (plaster of Paris) whereupon it is brought into hot or boiling electrolyte solution. The suspension obtained in one or other manner is then left undisturbed for a substantial time while the temperature is slowly decreasing, until relatively coarse crystals of dihydrate of calcium sulphate are formed, which are readily separated mechanically from the impurities, which are precipitated to a large extent. In this case the coarse crystals are formed in a relatively hot solution, the optimum temperature of crystallization for each material depending upon the concentration and characteristics of the electrolyte solution.

However, it has generally been found more advantageous to carry on the dehydration of the gypsum in the electrolyte solution until insoluble anhydrite is formed, such as is also obtained by dry heating to more than 300° C. (dead burning the gypsum). For this purpose the crude gypsum or impure calcium sulphate is treated in the form of soluble anhydrite or on the form of partly dehydrated gypsum with the electrolyte solution in the presence of insoluble anhydrite, e. g. part of the product of the preceding dehydrating operation, or in the presence of a certain quantity of gypsum dehydrated in the dry way, e. g. plaster of Paris containing 2–6% $H_2O$, this treatment being effected at a relatively high temperature, preferably above 80° C., and for such a time until the nearly complete transformation into insoluble anhydrite is ascertained microscopically. The hot suspension of insoluble anhydrite may then be rapidly cooled to about 40° C., and is then left undisturbed while coarse crystals of dihydrate are formed while the cooling-down proceeds gradually.

Mainly diluted solutions of sulphuric acid and alkali sulphates are suitable for the electrolyte solutions, but diluted solutions of other acids and salts, e. g. ammonium salts, such as ammonium chloride or ammonium sulphate, sodium chloride, hydrochloric acid and the like are also suitable. Acid solutions are generally preferred in order that the soluble impurities and particularly iron may be dissolved which are present in the initial material. It is fully sufficient if the concentration of the solutions corresponds, for example, from 1–5% sulphuric acid, in a given case with the addition of 1–5% of alkali sulphate; however, stronger solutions, e. g. 5–10% and more of acids or/and salts may also be used, but no particular advantages are obtained thereby.

The coarse crystals of dihydrate formed during the slow crystallization of the dehydrated calcium sulphate are readily separated from the impurities precipitated during the crystallization, this separation being effected by any method allowing to separate particles of different size, for example, by washing, classifying, or wet sieving. For this purpose the crystal-paste may for example be passed through a pair of rolls and be freed in a following depositing vessel from the impurities consisting of parts of smaller size. However, the mass may instead be simply washed with water on a spraying sieve, or other methods of mechanical separation may be used. The gypsum thus obtained is very pure and excellently suitable for the production of high-quality calcium-sulphate products.

The formation of the coarse crystals of dihydrate is favourably influenced by mixing with the suspension of the dehydrated calcium sulphate used for the crystallization, coarse dihydrate of calcium sulphate at a temperature below 80° C. and in a quantity of for example 10% or more. Instead of previously formed dihydrate of calcium sulphate a small quantity, e. g. .5-2% of plaster of Paris containing 2-6% of water may be added during the recrystallization of insoluble anhydrite to dihydrate.

In some cases it has moreover been found advantageous to subject the crude gypsum transformed in the manner indicated into insoluble anhydrite to a preliminary washing by which the coarse impurities such as sand and the like are removed. The washed material may then be subjected to the crystallization to dihydrate of calcium sulphate in the same electrolyte solution in which the boiling of the crude material to insoluble anhydrite has been effected, the temperature of this solution having decreased in the meantime to about 40° C. The crystallization in the undisturbed state which leads to the desired coarse dihydrate of calcium sulphate is generally completed after 12-24 hours, more particularly so when it is carried out in the presence of coarse dihydrate previously formed. On the other hand the fine needle-shaped crystals of gypsum, which are formed when the crystallization is disturbed and rapidly effected, will only be transformed into the desired coarse form when they have been in contact with the electrolyte solution for a long time of many days. This subsequent transformation is somewhat facilitated if the electrolyte solution contains ammonium salts such as ammonium chloride.

Having now described our invention, what we claim as new and desire to secure by Letters Patent is:

1. A method of purifying calcium sulphate consisting in treating impure calcium sulphate in an electrolyte solution in the presence of insoluble anhydrite at an increased temperature, about 80° C. until the calcium sulphate is almost completely transformed into insoluble anhydrite, then cooling the electrolyte solution to about 40° C. and leaving it undisturbed for a substantial time under such conditions that relatively coarse crystals of dihydrate of calcium sulphate have been formed, and separating said crystals from the impurities present in solid form and in solution.

2. A method of purifying calcium sulphate consisting in treating impure calcium sulphate in an electrolyte solution in the presence of a certain amount of plaster of Paris with 2 to 6% water at an increased temperature, about 80° C. under such conditions that the calcium sulphate is almost completely transformed into insoluble anhydrite, then cooling the electrolyte solution to about 40° C. and leaving it undisturbed for a substantial time, until relatively coarse crystals of the dihydrate of calcium sulphate have been formed, and separating said crystals from the impurities present in solid form and in solution.

3. A method as claimed in claim 1, in which the initial material after being transformed into insoluble anhydrite is subjected to preliminary washing for removing such impurities as sand, whereupon the treatment is continued with the washed material.

4. A method as claimed in claim 1, in which the initial material after being transformed into insoluble anhydrite is subjected to preliminary washing for removing such impurities as sand, whereupon the treatment is continued with the washed material in the same electrolyte solution.

5. A method as claimed in claim 2, in which the initial material after being transformed into insoluble anhydrite is subjected to preliminary washing for removing such impurities as sand, whereupon the treatment is continued with the washed material.

6. A method as claimed in claim 2, in which the initial material after being transformed into insoluble anhydrite is subjected to preliminary washing for removing such impurities as sand, whereupon the treatment is continued with the washed material in the same electrolyte solution.

PAUL KUBELKA.
ERNST REINER.